United States Patent [19]

Nafisi-Movaghar

[11] Patent Number: 4,781,936

[45] Date of Patent: Nov. 1, 1988

[54] COLORING COMPOSITIONS

[75] Inventor: Karim Nafisi-Movaghar, Walnut Creek, Calif.

[73] Assignee: Del Monte Corporation, San Francisco, Calif.

[21] Appl. No.: 883,607

[22] Filed: Jul. 9, 1986

[51] Int. Cl.$^4$ .................... A23L 1/28; A23L 1/27
[52] U.S. Cl. ................... 426/429; 426/540
[58] Field of Search ............. 426/250, 540, 429, 651

[56] References Cited

U.S. PATENT DOCUMENTS

| | | | |
|---|---|---|---|
| 1,840,798 | 1/1932 | Tressler | 426/429 |
| 2,799,588 | 7/1957 | Todd | 426/540 |
| 3,125,451 | 3/1964 | Wingerd et al. | 426/250 |
| 3,162,538 | 12/1964 | Todd | 426/250 |
| 3,340,250 | 9/1967 | Sair et al. | 260/236.5 |
| 3,930,037 | 12/1975 | Yokaoyama et al. | 426/268 |
| 4,126,709 | 11/1978 | Johnson et al. | 426/540 |
| 4,163,803 | 8/1979 | Goldscher | 426/250 |
| 4,185,121 | 1/1980 | Huster et al. | 426/250 |
| 4,377,520 | 3/1983 | Howell et al. | 260/236.6 |
| 4,380,553 | 4/1983 | Schmidt | 426/250 |
| 4,400,398 | 8/1983 | Coenen | 426/429 |
| 4,452,822 | 6/1984 | Shrikhande | 426/49 |
| 4,475,919 | 10/1984 | Woznicki | 8/518 |
| 4,500,556 | 2/1985 | Langston | 426/540 |
| 4,675,198 | 6/1987 | Sevenants | 426/429 |

FOREIGN PATENT DOCUMENTS

| | | |
|---|---|---|
| 1168890 | 4/1961 | Fed. Rep. of Germany . |
| 52-003741 | 1/1977 | Japan . |
| 54-024940 | 2/1979 | Japan . |
| 876686 | 10/1981 | U.S.S.R. . |

OTHER PUBLICATIONS

Palmer, L. S., Carotinoids and Related Pigments, The Chem. Catalogue Co., Inc., N.Y., p. 215, 1922.

*Primary Examiner*—Jeanette Hunter
*Attorney, Agent, or Firm*—Richard Kornutik

[57] ABSTRACT

A yellow coloring composition, useful in coloring foods, is prepared by extraction of effective amounts of coloring compounds from tomatoe peel. Tomato peels are ground before color extraction using polar extraction solvents having at 25° C. a dielectric constant ranging from about 20 to 30.

10 Claims, 3 Drawing Sheets

COLORING COMPOSITIONS

This invention relates to coloring compositions and methods for their preparation and use, and particularly to food colorings prepared from tomatoes and parts thereof. More specifically, the invention relates to a yellow coloring composition and extraction thereof from tomato peel.

BACKGROUND OF THE INVENTION

It is known that certain coloring materials may be extracted from tomato peel. For instance Russian author's Certificate No. 876,686 describes the multiple extraction of color bodies from tomato peel using dichloroethane. However, this relatively non-polar extraction solvent tends not to be color selective and extracts certain components exhibiting orange and/or red characteristics which may be undesirable in certain applications. Moreover, it is likely that many countries would not permit the use of coloring materials obtained by dichloroethane extraction for coloring food products, pharmaceuticals, or any other products to be ingested into the body. A number of food colorings have, in the past, aroused concern over possible adverse health effects, and thus there is a need for coloring compounds derived from natural sources in a manner that does not adversely affect their safety and efficacy.

It is an object of the instant invention to provide a coloring composition exhibiting good color intensity and stability toward UV radiation and heat.

It is another object of the invention to provide a coloring composition that can be prepared in a number of different forms, i.e., powder, paste, solution, etc., such that users of the compositions may choose a form best suited to their particular needs.

It is another object of the invention to provide a coloring composition which is acceptable for use in food and pharmaceutical products.

It is another object of the invention to provide a storage-stable yellow coloring composition which is stable under a multitude of conditions including subjection to heat, light and pH variations.

It is another object of the invention to provide a coloring composition which is economical to manufacture and reliable in use.

It is yet another object of the invention to provide a food coloring composition derived from a common vegetable source so that extensive testing will not be required for government, e.g., FDA, approval of its use in manufactured food products.

These and other objects will become apparent from a thorough reading of the instant disclosure.

BRIEF DESCRIPTION OF THE INVENTION

In accordance with the instant invention a coloring composition is prepared by contacting tomatoes or parts thereof with an amount of a polar extraction solvent sufficient to extract from said tomatoes or parts an effective amount of at least one coloring component, and separating the tomatoes or parts from the extracted components. Preferably the solvent is not toxic to humans. Also in accordance with the invention, foods and pharmaceuticals may be colored by isolating tomato peel, drying said peel, optionally grinding the resulting dry peel into a powder, and admixing the peel, powder, or a component extracted therefrom with a food or pharmaceutical in an amount which is effective to alter the visually observable color characteristics of the food or pharmaceutical.

It has also been found that adjusting the polarity of the extraction solvent can change the color or hue of the extracted composition. In preferred embodiments of this invention polar organic extraction solvent is selected to extract yellow colored components from the tomato peel. The speed of extraction tends to vary with solvent concentration.

The present invention also provides a coloring composition comprising a component extracted from tomato peel with a polar non-toxic solvent, said component being an effective colorant. The coloring composition, when dissolved in ethanol, absorbs light of wavelengths between about 400 and about 510 nanometers and exhibits principle visible-range absorption peaks at wavelengths between about 440 and about 465 nanometers.

The invention will be further elucidated by the following detailed description when read in conjunction with the drawings.

DETAILED DESCRIPTION OF CERTAIN PREFERRED EMBODIMENTS

In certain preferred embodiments of the instant invention, tomatoes, either raw or thermally treated, are further processed in a number of ways known in the food processing art, and tomato peel and seeds remain as a byproduct of that processing. It is desirable in accordance with the instant invention to subject such by-products to a separation technique such as water floatation wherein tomato peel floats to the surface of water in a water-filled floatation tank while seeds drop to the bottom of the flotation tank. Tomato peel can then be readily separated from the seeds. The isolated tomato peel may then be dehydrated, if desired, in any conventional manner such as air drying, or pressing followed by air drying. The dry peels which are a good source of natural color may then be ground for use as a powdered coloring agent. A preferred average particle diameter for the powdered coloring agent is about 100 to about 250 microns. Particles of about 140 to about 150 microns or particles of about 100 mesh (U.S. standard) size are particularly preferred.

In other preferred embodiments, the peel may be prepared for solvent extraction. For extraction purposes, peel need not be dried or ground. However, drying or grinding may facilitate the extraction process, particularly when peel is ground to a very fine particle size.

Figure 1:
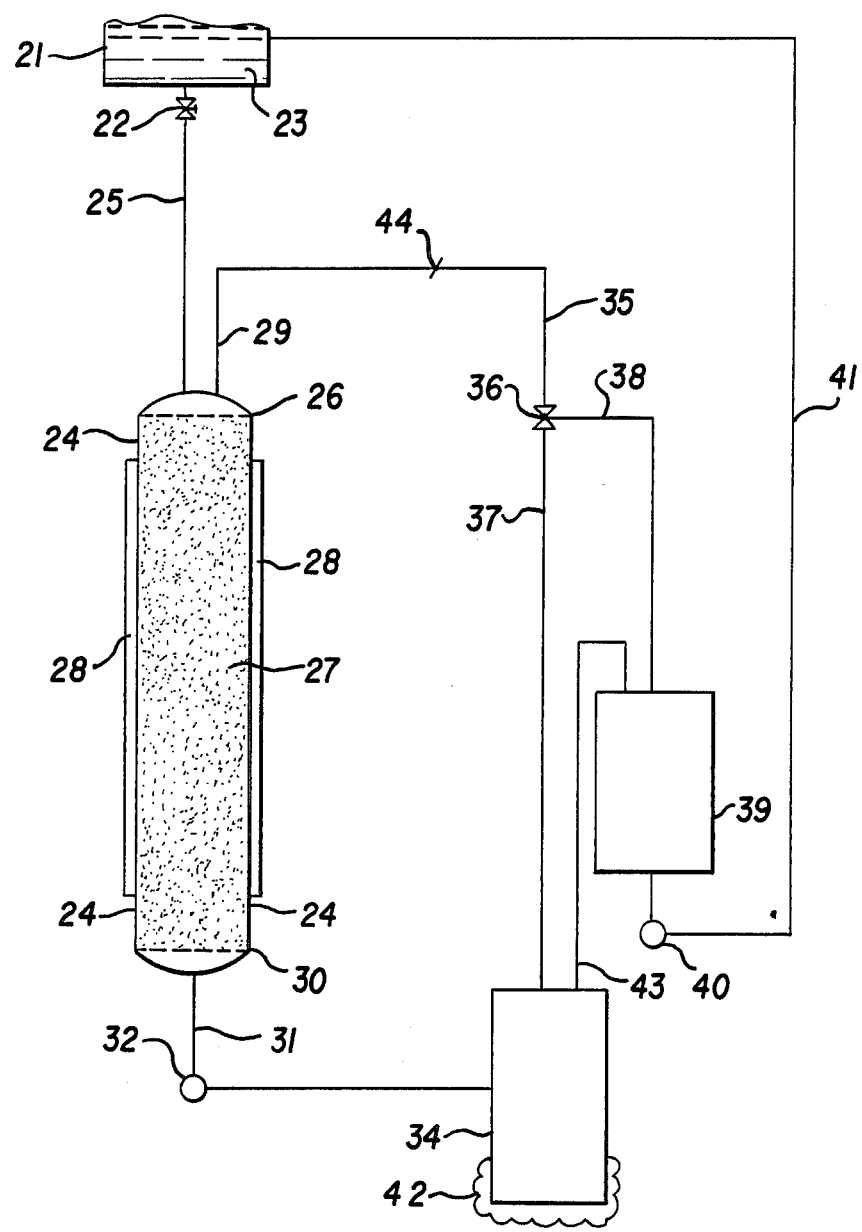
FIG. 1 is a schematic drawing of an apparatus for practicing the invention.

FIG. 1 is a schematic diagram of an exemplary batch percolating system usable in the instant extraction process, including a cross-sectional view of an exemplary extraction column usable in the illustrated system. There is shown in FIG. 1 a solvent storage receptacle 21 which is in fluid communication with extraction column 24 along line 25. Line 25 includes valve 22 which may be opened to allow solvent 23 to flow through line 25 and into column 24, or alternatively may be closed to stop the flow of solvent 23 down line 25. Column 24 is preferably loaded, between upper screen 26 and lower screen 30 with tomato peel 27. Steam heating jacket 28 may cause solvent 23 which has been introduced into column 24 to percolate through tomato peel 27. Other heating means may, of course, be employed where desirable. Solvent 23 extracts desired coloring compounds from tomato peel 27 and solvent having the extracted coloring compounds dissolved therein will flow under the force of gravity through lower screen 30 where it separates from the tomato peel and travels into line 31 through which it is transported to pump 32 which, when activated, pumps the extracted coloring compounds to product receptacle 34. Solvent vapor may escape from extraction column 24 through line 29 where it may condense. Once condensed, some of the solvent may fall back into extraction column 24 and some may enter line 35 where it will be directed by three-way valve 36 into either line 37 leading to product receptacle 34 or into line 38 leading to solvent recovery receptacle 39. If the pressure of solvent vapor in line 29 exceeds desirable levels, vapor may be released through pressure relief valve 44 resulting in a reduction of pressure. When it is desirable to produce a very dilute coloring composition, extra dilution may be accomplished by setting three-way valve 36 in such a manner as to direct additional solvent along line 37 into product receptacle 34 where it will dilute the dissolved coloring composition therein. When valve 36 directs the condensed solvent along line 38, the solvent accumulates in solvent recovery receptacle 39 from which it may be recirculated by pump 40 along line 41 to solvent storage receptacle 21.

When it is desirable to concentrate the coloring composition, heating element 42 may be activated to distill solvent away from the coloring composition in product receptacle 34 along line 43 in such a manner that condensed solvent is accumulated in solvent recovery receptacle 39. Of course, the coloring may be concentrated by merely allowing solvent to evaporate.

Figure 2:
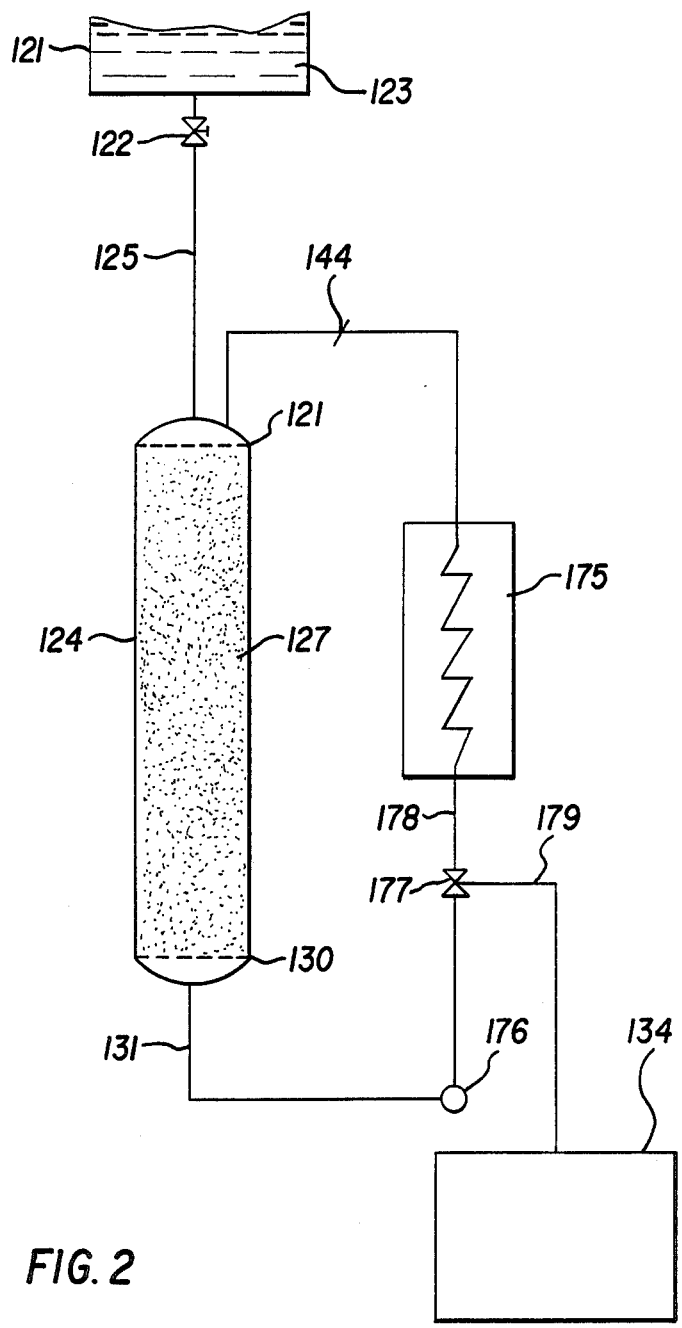
FIG. 2 is a schematic drawing of an alternative apparatus for practicing the invention which provides a continuous solvent extraction process.

In addition to using the foregoing percolation chamber for extraction, other solvent extraction techniques such as countercurrent extraction may be employed. For example, FIG. 2 shows such a countercurrent system. There is shown in FIG. 2 a solvent storage receptacle 121 which is in fluid communication with extraction column 124 along line 125. Line 125 includes valve 122 which may be open to allow solvent 123 to flow through line 125 and into column 124, or alternatively may be closed to stop the flow of solvent 123 down line 125. Column 124 is preferably loaded, between upper screen 126 and lower screen 130 with tomato peel 127. Pump 176 drives any solvent along line 131 into the column and upward through tomato peel 127 where it extracts coloring compounds from the peel. The extracting solvent is continuously pushed upward through column 124 until it escapes through top screen 126 where it leaves behind tomato peel 127. The solvent, including extracted coloring compounds, then enters line 144 which transports the solvent to heat exchanger 175. Solvent is constantly heated as it passes through heat exchanger 175 and into line 178 which conducts the solvent to three way valve 177 which may either direct the solvent along line 179 to product container 134 or, alternatively, along line 178 back to pump 176 which recirculates the solvent back through column 124.

Preferred solvents are polar organic solvents. The solvent is desirably tasteless or good-tasting. It should have at most low toxicity and no adverse effects on coloring compounds. It is desirably volatile and inexpensive. Solvents with dielectric constants ranging from 1.97 to 78.00 at 25° C. are preferred, especially solvents having dielectric constants between about 20.00 and 30.00 at 25° C. Particular solvents useful in the practice of the instant invention include ethanol, liquid carbon dioxide, lower alkyl and aryl solvents, lower alcohols (about 8 carbon atoms or less), ethers, ketones and aldehydes each being modified where necessary to achieve the desired polarity. Ethanol, particularly in concentrations above 50% and most particularly in a concentration of about 95% is especially preferred. It is desirable, in producing food colorings, that a solvent be used which is non-toxic when ingested by humans.

Extraction time may range from about 10 minutes to about 3 days. A typical extraction time is about 4 to about 6 hours.

It is believed that extraction is most efficient at a temperature at or near the boiling point of the extraction solvent. For example, when pure or nearly pure ethanol is used as the extraction solvent, the preferred extraction temperature is about 78° to 79° C. (at atmospheric pressure). However it is not necessary that the solvent be heated, and extraction can be expected to proceed over a wide range of temperatures. If desired, the solvent may be heated above its normal boiling point so long as sufficient pressure is applied to maintain the solvent in its liquid state.

The extracted color may be very dilute or very concentrated as desired. Additional solvent may be added to further dilute the extraction product if desired. Alternatively, solvent may be removed by conventional methods such as vacuum distillation in order to concentrate the extraction product. In the event that substantially all solvent is removed the product takes on the appearance and consistency of a powder or paste.

The invention is further illustrated by the following examples which are set forth only as illustrations of the instant invention and not as limitations thereof.

EXAMPLES

Example 1

100 tons of tomato by-product from the processing of tomatoes is collected, said by-product consisting primarily of peel and seeds. The by-product is subjected to water flotation wherein tomato peel is isolated resulting in about 50 tons of wet skin which is then pressed and air dried resulting in approximately 12 tons of dry skin. The dry skin is ground to a powder having a average particle size of about 145 to about 150 microns. The powder may be combined with or added to a food product or pharmaceutical composition to modify the color thereof.

Example 2

Tomato peel is prepared as in Example 1 and then processed in an apparatus such as the one shown in FIG. 1. The peel is percolated, at about atmospheric pressure, with an extraction solvent comprising 95% ethanol for about 5 hours at a temperature of 78° C. to extract coloring components from the tomato peel. The aqueous ethanol solvent, which contains the extracted coloring components is then collected, and the solvent is removed by vacuum distillation. A pure coloring composition results having the appearance and consistency of a paste.

Example 3

Coloring compositions prepared in accordance with the instant invention (both ground peel and peel extract) were tested for stability under a number of conditions. No significant color change was observed when the coloring was subjected to acid conditions at a pH between 3.0 and about 7.0. This range is the most common pH range for food processing. When the coloring compositions were heated to about 350° F., it was observed that no appreciable discoloration or loss of effectiveness occurred. The coloring also exhibited good stability upon exposure to light. It was observed that commercial beta-carotene lost yellow color faster than did the instant coloring composition upon exposure to short wave ultra violet light, and that over a period of 120 minutes of exposure the instant composition continued to retain more yellow color than the compared beta-carotene.

Example 4

Figure 3:
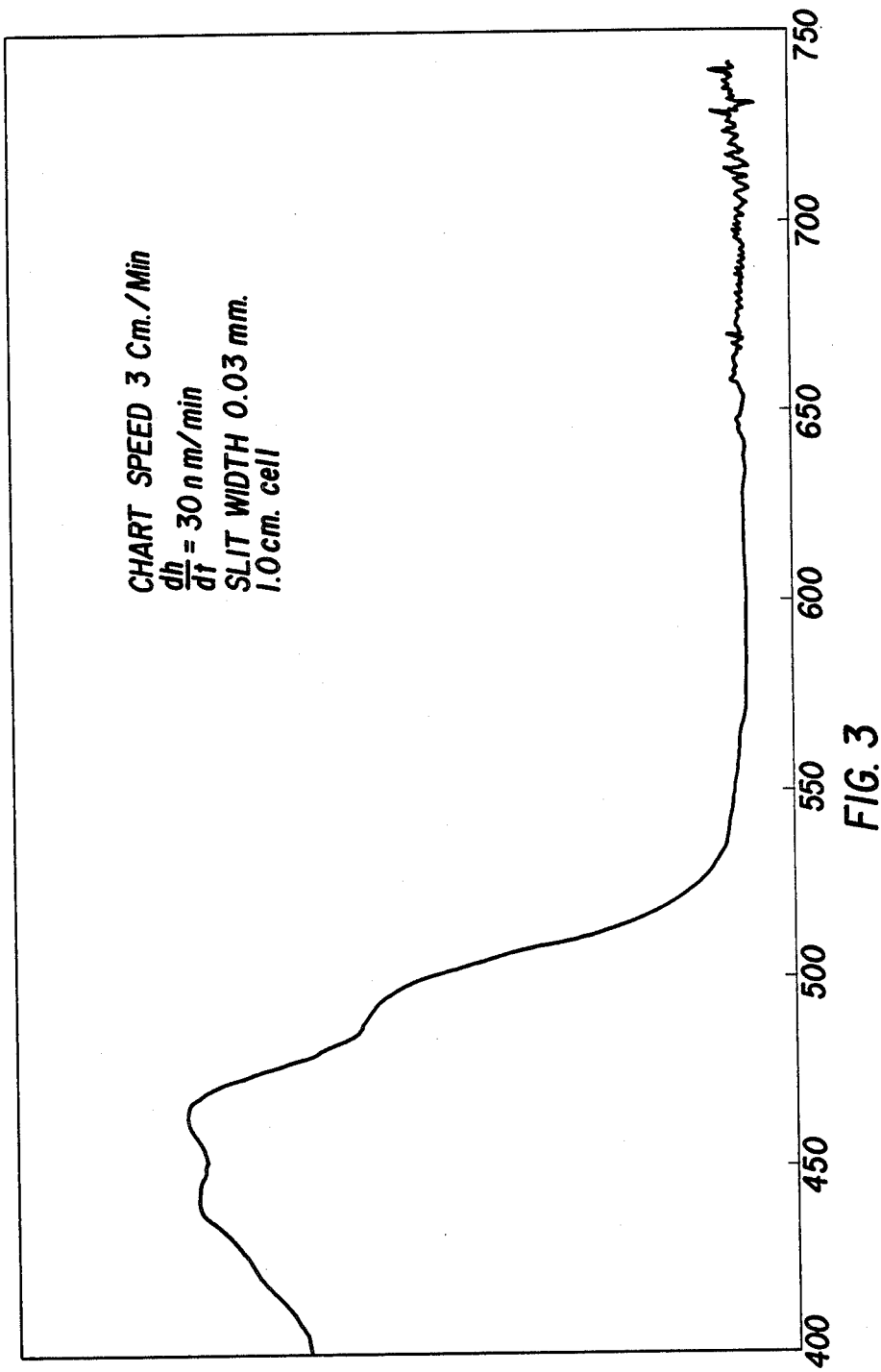
FIG. 3 is a visible spectra of a preferred coloring composition of the instant invention.

A coloring composition was produced by extraction of tomato peel in accordance with the instant invention. A visible spectra of the coloring composition is shown in FIG. 3.

The foregoing description of the invention and examples are set forth by way of illustration only and not by way of limitation. The specific terms and descriptions used herein are not intended to exclude the wide variety of alternatives which those of skill in the art will readily recognize as available for the practice of the instant invention as defined by the following claims.

What is claimed is:

1. A process for isolating a yellow coloring component from tomato peel which comprises exposing tomato peel to a non-toxic polar extraction solvent having at 25° C. a dielectric constant ranging from about 20 to about 30 effective to provide a yellow colored extract in said solvent.

2. The process according to claim 1, wherein the extraction is conducted at a temperature of about the boiling point of the extraction solvent.

3. The process according to claim 1, wherein the extraction solvent comprises ethanol.

4. The process according to claim 3, wherein the ethanol is present in a concentration of at least about 50% by volume of the solvent.

5. The process according to claim 4, wherein the ethanol is present in a concentration of at least about 95% by volume of the solvent.

6. The process according to claim 1, which further comprises concentrating the yellow coloring component by removing solvent from the extracted component.

7. The process according to claim 6, wherein solvent removal ia accomplished by vacuum distillation.

8. The process according to claim 1, which further comprises diluting the yellow coloring component by combing the extracted component with additional solvent.

9. The process according to claim 1, wherein the tomato peel is ground prior to being contacted with solvent.

10. A yellow coloring component prepared according to claim 1.

* * * * *